(12) United States Patent
Nakajima

(10) Patent No.: US 8,587,812 B2
(45) Date of Patent: Nov. 19, 2013

(54) IMAGE PROCESSING APPARATUS, METHOD, AND MEDIUM FOR PROCESSING IMAGES FOR PRINTING

(75) Inventor: Nobuyuki Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 12/964,621

(22) Filed: Dec. 9, 2010

(65) Prior Publication Data

US 2011/0242555 A1 Oct. 6, 2011

(30) Foreign Application Priority Data

Mar. 30, 2010 (JP) ................................ 2010-078295

(51) Int. Cl.
*G06F 3/12* (2006.01)
(52) U.S. Cl.
USPC ................ 358/1.15; 358/1.9; 709/232; 710/6
(58) Field of Classification Search
USPC .................... 358/1.9, 1.15; 709/232; 710/6
See application file for complete search history.

(56) References Cited

U.S. PATENT DOCUMENTS

| 5,913,018 | A  | * | 6/1999 | Sela ............................. 358/1.17 |
| 6,369,910 | B1 |   | 4/2002 | Mitani |
| 7,256,908 | B2 | * | 8/2007 | Mitani ......................... 358/1.15 |
| 2004/0207860 | A1 | * | 10/2004 | Kurihara ....................... 358/1.2 |
| 2009/0027715 | A1 | * | 1/2009 | Kuhn et al. .................. 358/1.15 |

FOREIGN PATENT DOCUMENTS

| CN | 1620101 A | 5/2005 |
| JP | 11-198462 A | 7/1999 |

* cited by examiner

*Primary Examiner* — King Poon
*Assistant Examiner* — Jamares Q Washington
(74) *Attorney, Agent, or Firm* — Canon USA Inc. IP Division

(57) ABSTRACT

An image processing apparatus includes an input unit configured to input a plurality of page data; a rendering unit configured to convert each of the plurality of page data into rendering data; a supply unit configured to supply the plurality of rendering data to a printing apparatus; an acquisition unit configured to acquire, for each of the plurality of rendering data, delay time from an end of printing of a last page to an end of conversion of rendering data used for next printing; and a scheduling unit configured to delay supply timing of rendering data converted first by the rendering unit among the plurality of page data based on the delay time of the plurality of rendering data.

13 Claims, 9 Drawing Sheets

FIG.7A

| PAGE ID | RIP PROCESSING | PRINTING TIME | PROCESSING TIME FROM RIP START | | | DELAY |
|---|---|---|---|---|---|---|
| | | | RIP END | TRANSMISSION START | PRINTING END | |
| 001 | 30 | 50 | 30 | 30 | 80 | 0 |
| 002 | 30 | 40 | 60 | 80 | 120 | 0 |
| 003 | 60 | 70 | 120 | 120 | 190 | 0 |
| 004 | 70 | 40 | 190 | 190 | 230 | 0 |
| 005 | 60 | 50 | 250 | 230 → 250 | 300 | 20 |
| 006 | 30 | 50 | 280 | 300 | 350 | 0 |
| 007 | 60 | 50 | 340 | 350 | 400 | 0 |
| 008 | 80 | 40 | 420 | 400 → 420 | 460 | 40 |

FIG.7B

| PAGE ID | RIP PROCESSING | PRINTING TIME | PROCESSING TIME FROM RIP START | | | DELAY |
|---|---|---|---|---|---|---|
| | | | RIP END | TRANSMISSION START | PRINTING END | |
| 001 | 30 | 50 | 30 | 70 | 120 | 0 |
| 002 | 30 | 40 | 60 | 120 | 160 | 0 |
| 003 | 60 | 70 | 120 | 160 | 230 | 0 |
| 004 | 70 | 40 | 190 | 230 | 270 | 0 |
| 005 | 60 | 50 | 250 | 270 | 320 | 0 |
| 006 | 30 | 50 | 280 | 320 | 370 | 0 |
| 007 | 60 | 50 | 340 | 370 | 420 | 0 |
| 008 | 80 | 40 | 420 | 420 | 460 | 0 |

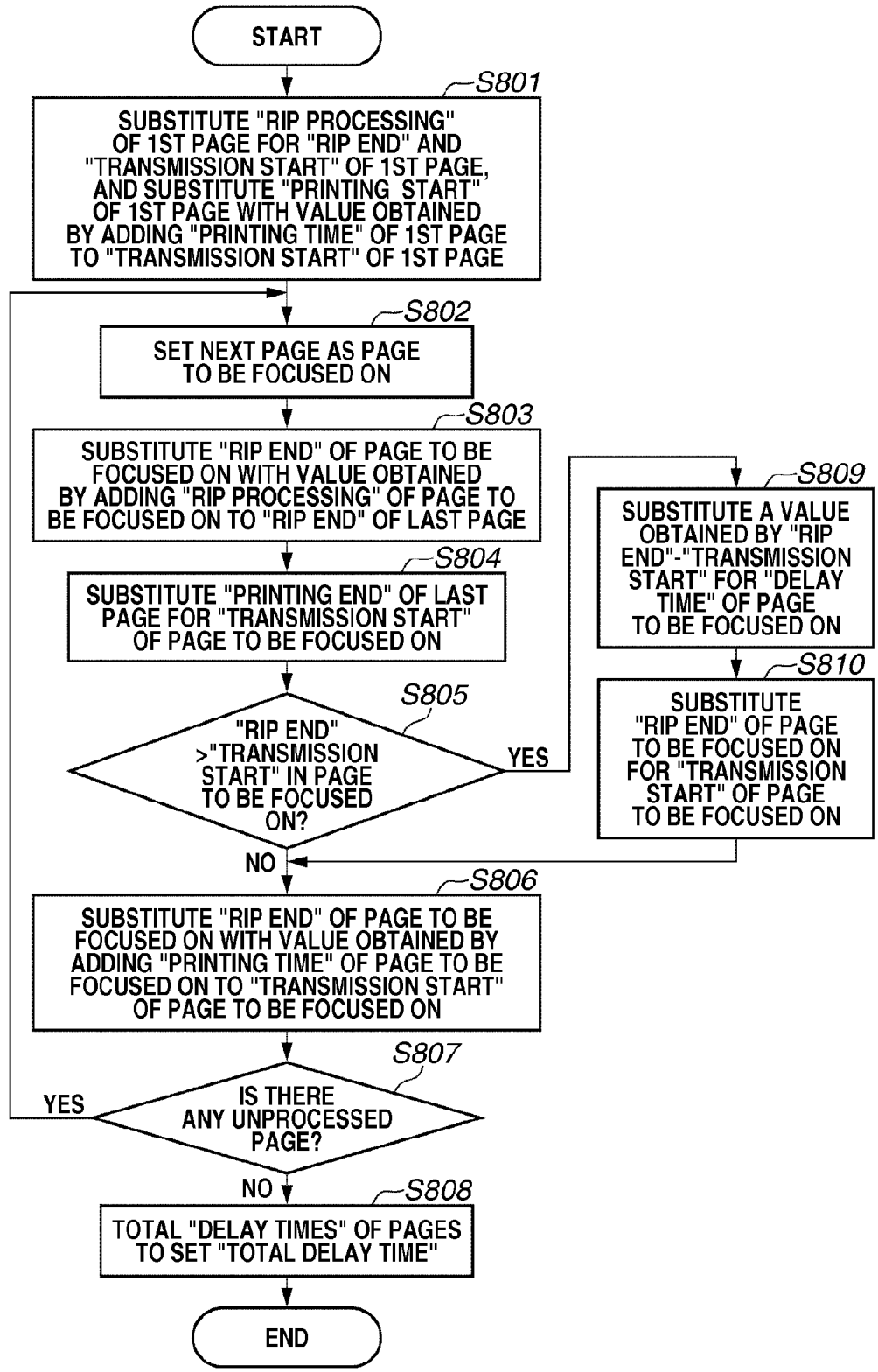

IMAGE PROCESSING APPARATUS, METHOD, AND MEDIUM FOR PROCESSING IMAGES FOR PRINTING

BACKGROUND OF THE INVENTION

1. Field of the Invention

The present invention generally relates to image processing and, more particularly, to an image processing apparatus that processes images for a printer, a control method therefor, and a computer-readable storage medium.

2. Description of the Related Art

There is widely used a printing apparatus (printer) that receives print data regarding a print content or a print format, creates (renders) a bitmap image to be actually output based on the print data, and prints the bitmap image on a recording medium such as paper.

Japanese Patent Application Laid-Open No. 11-198462 discusses a technology for dividing print data of one page into a plurality of bands, and preventing print overrunning based on time required for rendering the print data of each band and time required for printing when the print data of each band is printed on a recording medium to be output. The print overrunning means that when rendering and image formation are performed in parallel, the rendering is not in time for a start of printing (corresponding to a transfer start of bitmap data for forming an image), thus disabling normal print outputting.

The technology discussed in Japanese Patent Application Laid-Open No. 11-198462 stores, in order to prevent the print overrunning, the print data of the band where the rendering is not in time for the start of printing, in a temporary band memory temporarily added by rendering before the start of printing.

Print overrunning occurring in a printer that processes print data of a plurality of pages, and prints the data of the plurality of pages on a roll sheet (roll recording medium) will now be described.

Such a printer prints the data while conveying the roll sheet. Hence, when rendering is not in time for transfer of bitmap data, the roll sheet is wasted (blank sheets are continuously output), or time for stopping the roll sheet is necessary. In the stopping of the roll sheet, to prevent wasteful outputting of the roll sheet, the roll sheet is rewound to immediately before a normally printed page, and returning the roll sheet to a standby position to be ready for a next printing start. Thus, the printer that processes the roll sheet should preferably perform processing to prevent print overrunning, also between pages similar to that occurring between the bands discussed in Japanese Patent Application Laid-Open NO. 11-198462.

However, using the method discussed in Japanese Patent Application Laid-Open No. 11-198462 to prevent print overrunning between pages in the printer that prints data on the roll sheet results in low efficiency in use of the memory for storing the rendered bitmap.

Even in a case where a band requiring predetermined rendering time is included in a last page of a great many pages, the printer must continuously store previously rendered bitmap data to prevent print overrunning between pages. However, as timing of releasing the previously rendered bitmap data from the memory (timing of finishing printing) becomes later, a storage period of data in the memory becomes longer, resulting in low efficiency in use of the memory.

As apparent from the foregoing, when the method discussed in Japanese Patent Application Laid-Open No. 11-198462 is applied to the printer for the roll sheet, as the number of pages included in print data to be processed becomes larger, much more memory for storing the bitmap data (the temporary band memory) becomes necessary, causing a reduction of use efficiency.

SUMMARY OF THE INVENTION

The present invention is directed to an image processing apparatus that can efficiently use a memory for storing bitmap data, a control method therefor, and a computer-readable storage medium.

According to an aspect of the present invention, there is provided an image processing apparatus that includes an input unit configured to input a plurality of page data, a rendering unit configured to convert each of the plurality of page data into rendering data, a supply unit configured to supply the plurality of rendering data to a printing apparatus, an acquisition unit configured to acquire, for each of the plurality of rendering data, delay time from an end of printing of a last page to an end of conversion of rendering data used for next printing, and a scheduling unit configured to delay supply timing of rendering data converted first by the rendering unit among the plurality of page data based on the delay time of the plurality of rendering data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B illustrate schedule tables created in an exemplary embodiment of the present invention.

FIG. 8 is a flowchart illustrating processing to acquire delay time apparatus according to an exemplary embodiment of the present invention.

DESCRIPTION OF THE EMBODIMENTS

Various exemplary embodiments, features, and aspects of the invention will be described in detail below with reference to the drawings.

Relative positions of components and an apparatus shape described in an exemplary embodiment are only examples, and do not limit a scope of the present invention.

In the specification, a "printer" includes not only a dedicated machine specialized in printing function but also a multifunction peripheral combining a printing function and other functions, and a manufacturing device that forms an image or a pattern on a recording sheet.

Figure 1:
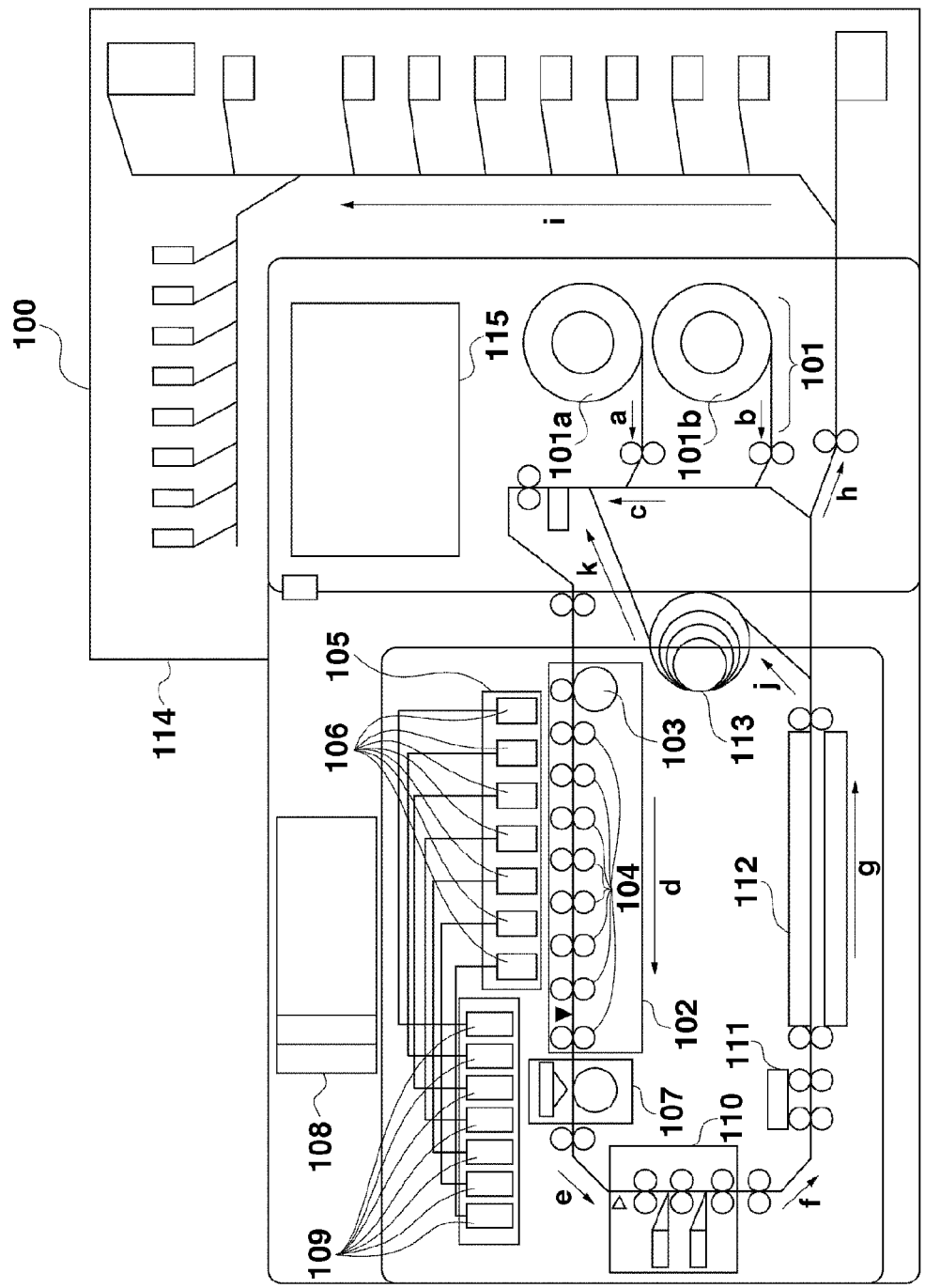
FIG. 1 is a schematic diagram illustrating a configuration of an image processing apparatus according to an exemplary embodiment of the present invention.

FIG. 1 is a schematic configuration diagram of a printer 100 as an image processing apparatus that uses, as a recording medium, a roll sheet (continuous sheet longer than a unit of printing in a conveying direction), illustrating a partial section so that an internal configuration can be clearly understood. The printer 100 includes a roll sheet unit 101, a conveyance unit 102, a conveyance encoder 103, a rotating roller 104, a cutter unit 110, a sheet take-up unit 113, and a sorting unit 114 that constitute a conveyance system, a head unit 105, a print head 106, a scanner unit 107, a control unit 108, an ink tank 109, a rear-surface printing unit 111, and a drying unit 112 that constitute a printing system, and an operation unit 115 that constitutes an operation system.

The control unit 108 includes a controller, a user interface, and various input/output (I/O) interfaces to perform various control operations for the apparatus as a whole. When no bitmap data is transferred in a continuously printable state after page printing, the roll sheet is wasted (blank sheets are continuously output), and hence the control unit 108 stops conveyance system of the roll sheet.

The roll sheet unit 101 includes two cassettes: an upper sheet cassette 101a and a lower sheet cassette 101b. A user sets roll sheets (hereinafter, sheets) in a container, and inserts the sheets into the cassettes from fronts to set them. The sheets pulled out from the upper sheet cassette 101a and the lower sheet cassette 101b by the roll sheet unit are respectively conveyed in a direction a and a direction b illustrated in FIG. 1. The sheets from the roll sheet unit 101 advance in a direction c illustrated in FIG. 1 to reach the conveyance unit 102. The conveyance unit 102 includes a plurality of rotating rollers 104, and conveys the sheets in the direction a (horizontal direction) illustrated in FIG. 1. Two or more cassettes can be prepared according to types of roll sheets.

The head unit 105 is disposed to face one surface of the conveyed sheet, and discharges ink to the conveyed sheet from a nozzle of the print head 106 to form an image on the sheet based on print data. In the configuration of the exemplary embodiment, seven print heads 106 are arranged in the direction d so that printing by using up to seven types of inks can be performed. The ink tank 109 independently stores ink of each color. For a method for discharging ink from the nozzle, the image processing apparatus can employ a method using a heating element, a method using a piezoelectric element, a method using an electrostatic element, or a method using a microelectromechanical systems (MEMS) element. Discharge timing of the print head 106 is determined based on an output signal of the conveyance encoder 103.

The scanner unit 107 reads a printed image or a special pattern (marker) on the sheet to check normal printing or a state of the apparatus.

The sheet conveyed from the scanner unit 107 is conveyed in a direction e. When necessary, the cutter unit 110 cuts the sheet for each length of a predetermined print unit. The print unit is determined beforehand according to a print mode, user's designation, or a size of an image to be printed. For example, when only printing of one surface has been completed in a two-sided print mode, the cutter unit 110 does not cut the sheet. The cutter unit 110 cuts the sheet to be 135 millimeters in the conveying direction in the case of an L-form photo, and to 297 millimeters in the conveying direction in the case of an A4 size.

The sheet cut by the cutter unit 110 is conveyed in a direction f illustrated in FIG. 1. The rear-surface printing unit 111 prints information (e.g., order management number) for each printed image on a rear surface on the other side of the sheet.

The drying unit 112 heats the sheet by hot air to dry the sheet that has received the ink, within a short time. The sorting unit 114 includes a plurality of trays (twenty-two in the exemplary embodiment), and sorts and stacks the conveyed sheets on set trays while checking by a sensor. The sorting unit 114 separates the stacking trays based on, for example, lengths of print units. A status such as stacking in progress or completion of stacking is displayed (e.g., display by a light emitting diode (LED)). The sorting unit 114 will be described below.

The sheet take-up unit 113 takes up a sheet on one surface on which printing has been completed in the case of the two-sided print mode. After completion of printing on one surface, the taken-up sheet is conveyed in a direction k illustrated in the figure, and printing is performed on a rear surface.

The operation unit 115 receives a user's instruction to change a printer setting or check a state. For example, the operation unit 115 notifies the user of a tray on which an output print product has been placed, a print mode and a state (ready, printing or completed) of the printer 100, or maintenance information (residual amount of ink, residual amount of paper, or time from latest head cleaning).

The image processing apparatus of an ink-jet type has been described. The present invention can be applied to a printing method using toner other than ink, and various printing methods. Examples are a thermal printer (sublimation type or thermal transfer type), a dot-impact printer, a LED printer, and a laser printer.

As illustrated in FIG. 1, a position (cutter unit 110) for cutting the printed roll sheet is located in a downstream side of an image forming position (head unit 105) in a conveying-direction. Hence, print overrunning easily occurs between the pages.

Figure 2:
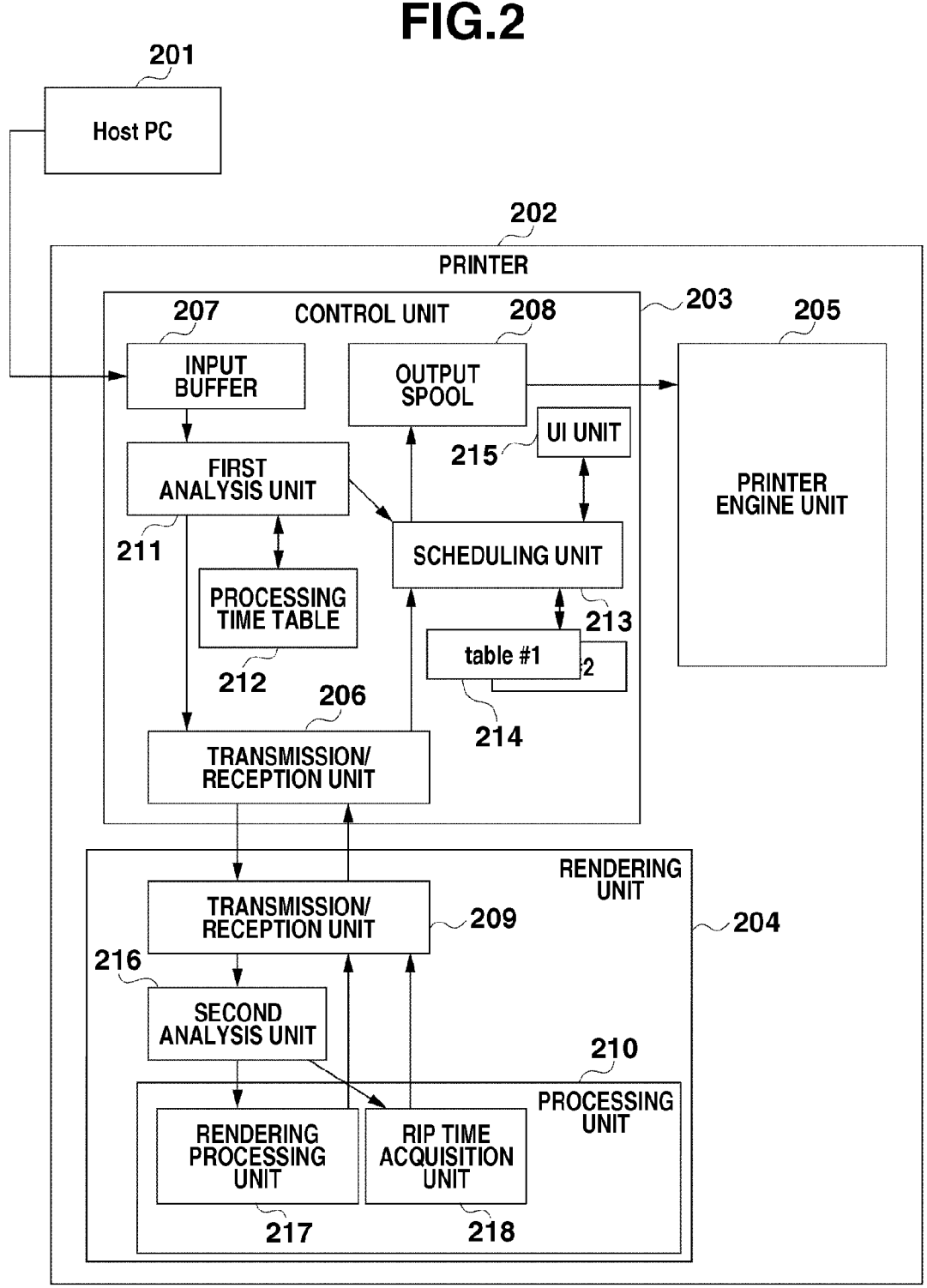
FIG. 2 is a block diagram illustrating a functional configuration of the image processing apparatus of FIG. 1.

Next, referring to FIG. 2, a functional configuration of the printer of the exemplary embodiment will be described. FIG. 2 is a functional block diagram of the printer of the exemplary embodiment. A printer 202 includes a control unit 203, a rendering unit 204, and a printer engine unit 205, and receives job data from an external host computer (host PC) 201 to start processing. The control unit 203 and the rendering unit 204 can communicate with each other via transmission/reception units 206 and 209.

The job data contains page data describing a content of each page of a printing target, and a parameter used for printing each page data. Each page is described in predetermined description language (e.g., page description language: PDL), and identification (ID) to identify order of pages of the respective page data is allocated. The parameter used for printing the page data is a value indicating information of a sheet to be printed or a print mode (scaling rate, resolution, two-sided/one-sided, or number of sheets to be printed).

The control unit 203 includes a transmission/reception unit 206, an input buffer 207, an output spool 208, a first analysis unit 211, a processing time table 212, a scheduling unit 213, a schedule table 214, and a user interface (UI) unit 215.

The input buffer 207 temporarily stores job data received by the printer 202, allocates ID (job ID) in input order, and inputs the job data to the first analysis unit 211. The first analysis unit 211 (second acquisition unit) takes out the job data stored in the input buffer 207 to determine data types.

The output spool 208 receives bitmap data (rendering data) rendered by a rendering processing unit 217 from the rendering unit 204, and stores and supplies the received bitmap data in reception order to the printer engine unit 205.

The first analysis unit 211 analyzes the job data stored in the input buffer 207. Creation of a schedule table is started if no schedule table has been created for the job data. Estimation of rendering time and acquisition of printing time are started (described below). In parts of the description below, for convenience, the rendering will be referred to as raster image processing (RIP). Similarly, the rendering time will be referred to as RIP time (rendering time), and the estimation of rendering time will be referred to as RIP time acquisition.

The processing time table 212 (processing time information) is used for acquiring printing time when printing is performed by using a pre-registered recording medium or RIP time of a pre-registered print format. For the print format, at least a print sheet size or resolution is uniquely determined (further print attributes: a text and an image can be included). For example, RIP time and printing time per page data when a photograph is printed with high resolution on a photo sheet of 4×6 inches (roll sheet having a width of about 6 inches in the case of a roll shape) are stored in the processing time table 212. If printing time of each page is clearly equal to or longer than rendering time (rendering time is shorter than printing time) when a predetermined print format is set in the job data, scheduling of the predetermined print format can be omitted. More specifically, a flag (skip flag) for omitting acquisition of rendering time and printing time and creation of a schedule table is set in the processing time table 212. In the exemplary embodiment, an example of a table format similar to the processing time table 212 is illustrated. However, information may not be in a table format as long as the information can be referred to when printing time or RIP time is calculated.

The scheduling unit 213 generates a schedule table 214 that shows timing of transmitting the bitmap data from the output spool 108 to the printer engine unit 205. The scheduling unit 214 can add, after acquisition of printing time and rendering time, a skip flag to a print format set in job data of (printing time)≥(rendering time), which is added to the processing time table. The UI unit 215 is an interface for receiving designation or a change of an algorithm of the scheduling unit 213.

The rendering unit 204 includes a transmission/reception unit 209, a second analysis unit 216, and a processing unit 210. The second analysis unit 216 analyzes job data received from the control unit 203. The processing unit 210 includes a rendering processing unit 217 that renders (based on PDL description) page data of the job data, and a RIP time acquisition unit 218 (first acquisition unit) that acquires RIP time. The printer engine unit 205 includes the conveyance system, the printing system, and the control unit 108 illustrated in FIG. 1.

Referring to a flowchart of FIG. 3, processing of job data by the printer 202 having the functional configuration illustrated in FIG. 2 will be described. In step S301, the printer 202 receives the job data. In reality, the printer 202 stores the job data transmitted from the host PC 201 in the input buffer 207.

In step S302, the first analysis unit 211 of the printer 202 analyzes the job data received in step S301 to determine whether a print format indicated by a parameter of the job data has been registered with a skip flag in the processing time table 212. If the print format has been registered with the skip flag (YES in step S302), scheduling is unnecessary, and hence the processing directly proceeds to step S304. If the print data has not been registered with any skip flag (NO in step S302), the processing proceeds to step S303.

In step S303, the printer 202 analyzes the input job data to create a schedule table. In step S304, the printer 202 converts the job data into bitmap data with the rendering unit 204 according to the created schedule table, and transmits the generated bitmap data to the printer engine unit 205 to perform printing.

Next, referring to FIGS. 4A and 4B, acquisition of "rendering time" and "printing time" used for creating the schedule table by the control unit 203 will now be described.

Figure 3:
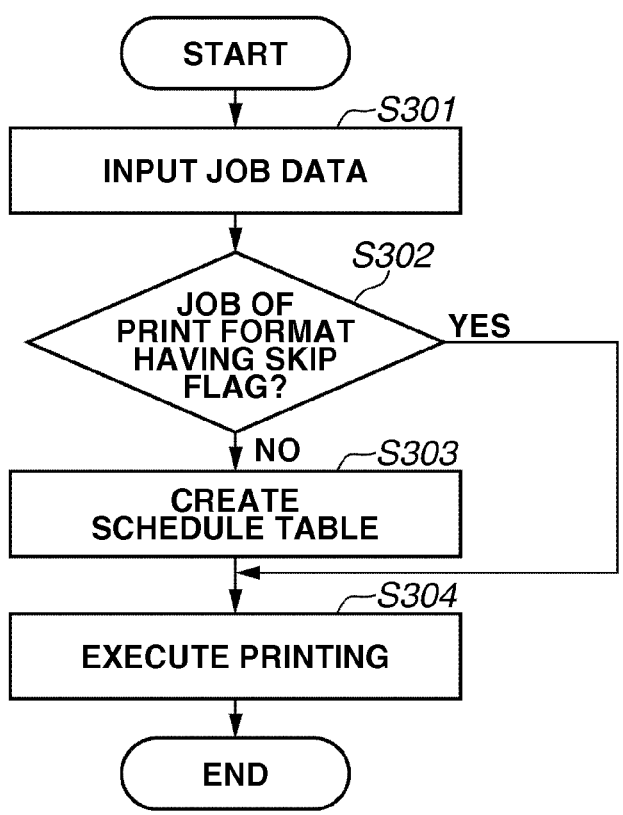
FIG. 3 is a flowchart illustrating an outline of processing apparatus according to an exemplary embodiment of the present invention.
Figure 4A:
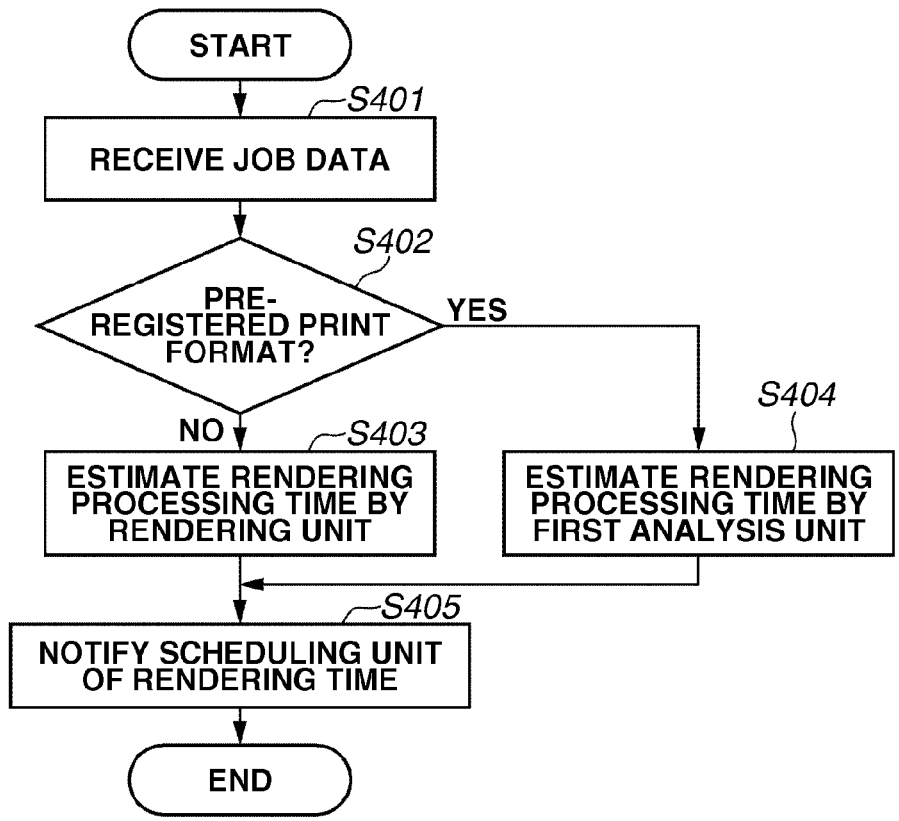
FIGS. 4A and 4B are flowcharts illustrating processing in acquiring the rendering time and printing time apparatus according to an exemplary embodiment of the present invention.

In step S401 illustrated in FIG. 4A, the control unit 203 receives job data (similar to step S301 illustrated in FIG. 3). In step S402, the first analysis unit 211 analyzes the job data stored in the input buffer 207 to determine whether a print format indicated by a parameter of the job data has been registered beforehand in the processing time table 212.

If the print format is not a pre-registered print format (e.g., size: 4×6 inches, and attribute: photograph) (NO in step S402), the processing proceeds to step S403, and the RIP time acquisition unit 218 estimates rendering time. When it is determined to cause the rendering unit 204 to estimate rendering time, the first analysis unit 211 copies the job data, and adds a flag indicating that the data is used for estimation, to transmit the job data to the rendering unit 204. The processing time estimation by the RIP time acquisition unit 218 will now be described below.

If the print format is a pre-registered print format (YES in step 402), the processing proceeds to step S404, and the first analysis unit 211 acquires rendering time of each page data of the job data by using the processing time table 212.

In step S405, the RIP time acquisition unit 218 (in the case of step S403) or the first analysis unit 211 (in the case of step S404) notifies the scheduling unit 213 of rendering time of each of a plurality of page data contained in the job data.

Figure 4B:
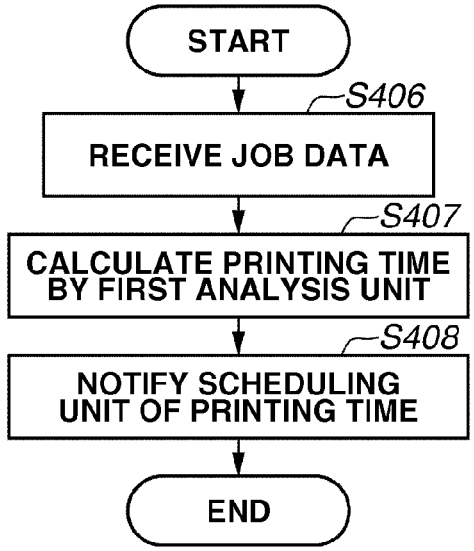

In step S406 illustrated in FIG. 4B, the control unit 203 receives job data (similar to step S401). In step S407, the first analysis unit 211 analyzes the job data stored in the input buffer 207 to extract information on a sheet size and a print mode, and calculates time for printing (printing time) for each page by using the processing time table 212. In step S408, the first analysis unit 211 notifies the scheduling unit 213 of the printing time. In the case of a roll sheet, printing time when performing printing by a unit length in a conveying direction is stored in the processing time table 212. Thus, even when a print area changes, printing time can be acquired as long as a length of an area to be printed in the conveying direction is known.

Even when a print area of a B5 size is set in the roll sheet, if a print format is an A4 size, time necessary for image formation of the B5 size and for paper-conveyance of a residual blank space becomes printing time. For example, a period of time from printing after reaching a tip of a certain page of an A4 size by the head unit 105 to reaching a tip of a next page corresponds to printing time. (Scheduling may be performed by including time for cutting the roll sheet by the cutter unit 110 in the printing time). Next, referring to a flowchart of FIG. 5, processing of the rendering unit 204 will be described. In step S501, the rendering unit 204 receives job data from the control unit 203. In step S502, the job data is analyzed to detect presence of an estimation flag. If no flag is present (NO in step S502), there is a request for rendering. If a flag is present (YES in step S502), there is a request for acquisition of RIP time.

The job data, when it is determined that the job data requests rendering in step S502, is transferred to the rendering unit 217. In step S503, the rendering unit 217 renders the job data in order based on job ID (and page ID). The rendering is processing for performing logical rendering or color conversion based on a predetermined page technology language of the received job data to generate bitmap data as rendering data.

For the job data, when it is determined that the job data requests acquisition of RIP time in step S502, RIP time is acquired in step S504.

Next, estimation of rendering time by the RIP time acquisition unit 218 will be described. Rendering time is estimated based on processing contents designated by the job data. Factors affecting processing time include resolution of bitmap data, and a rendering type and a rendering area of a text, graphics, or an image. To acquire RIP time of a rendering command, rendering time per unit area (inch$^2$) is acquired beforehand for each type of a rendering command to be stored in a table. Processing time of the rendering command is calculated by the following expression.

Processing time of a rendering command (second)=processing time (second) per inch$^2$ of a rendering command at a specific resolution (dots per inch (dpi))×rendering area (inch$^2$). The RIP time acquisition unit 218 totals processing time of a rendering command of the page data contained in the job data for each page to acquire processing time of each page. Even when one page includes a plurality of rendering commands, it suffices that a type and a rendering area of each rendering command are acquired from description in page description language to be totaled.

For estimation of the rendering time, in addition to the abovementioned method, the following method can be employed. Specifically, the rendering unit 217 executes rendering by actually using a part of the job data, and rendering time is estimated based on a result of measuring the processing time by the RIP time acquisition unit 218.

Figure 5:
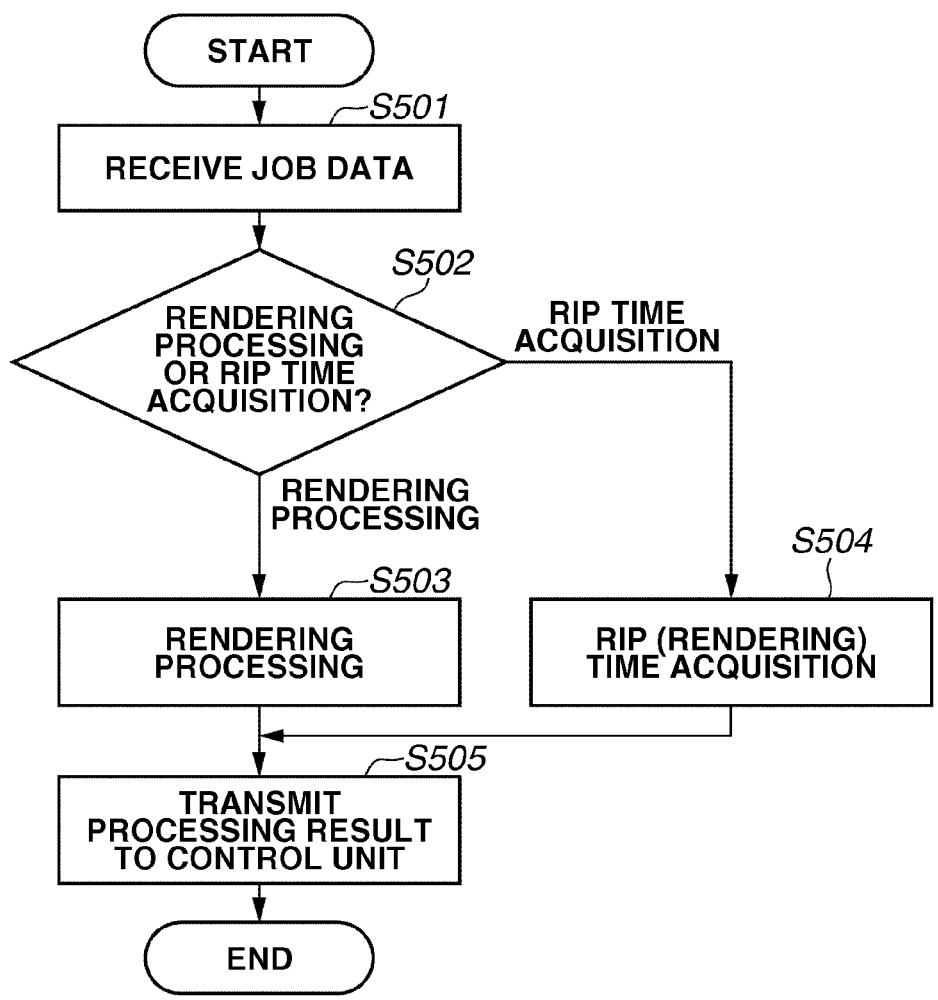
FIG. 5 is a flowchart illustrating processing of a rendering unit apparatus according to an exemplary embodiment of the present invention.

In step S505 illustrated in FIG. 5, the transmission/reception unit 209 of the rendering unit 204 transmits a result of the processing of step S503 or step S504 (S503: each bitmap image, and S504: RIP time for each page) to the control unit 203. The job data used for acquiring the RIP time can be discarded.

Figure 6:
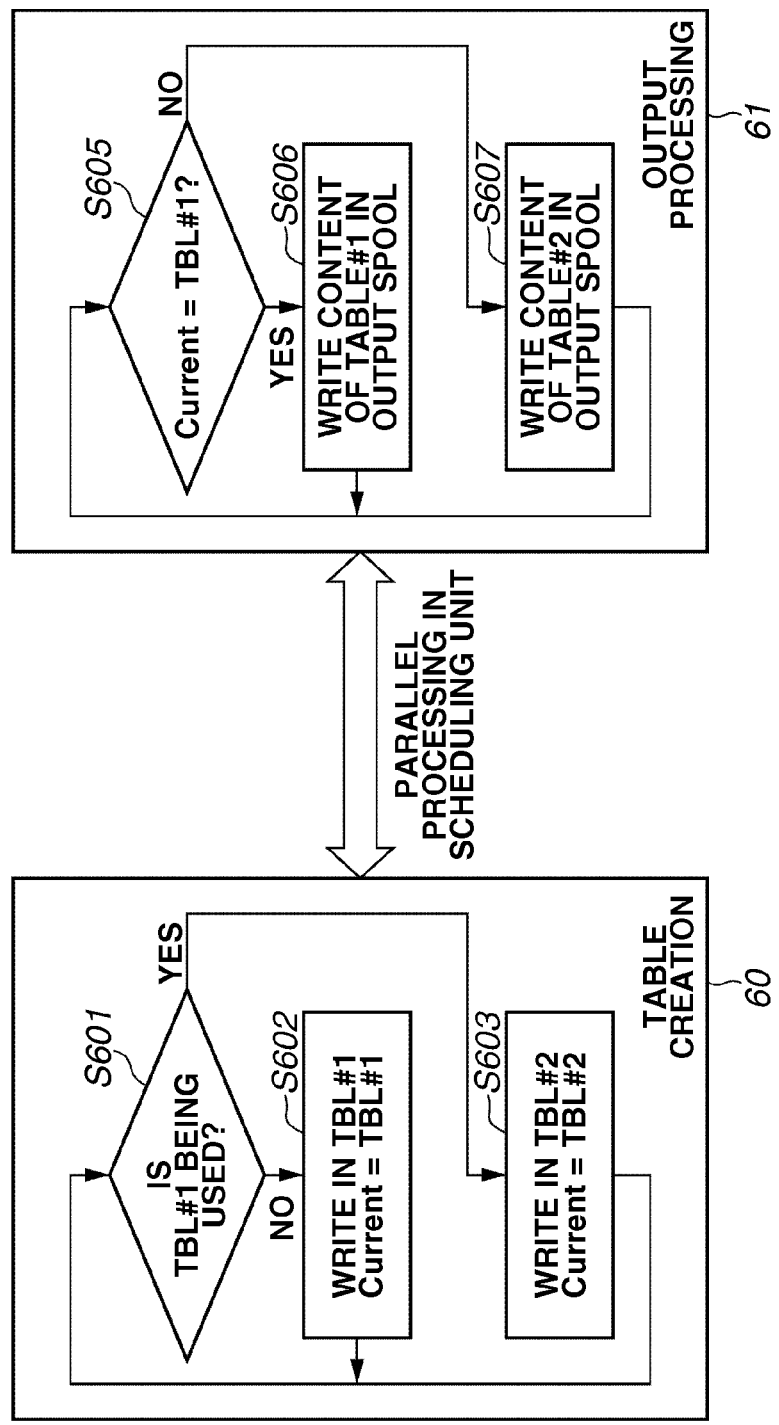
FIG. 6 is a flowchart illustrating parallel processing that uses a schedule table apparatus according to an exemplary embodiment of the present invention.

Next, referring to FIG. 6, processing of handling the schedule table 214 by the scheduling unit 213 will be described. The scheduling unit 213 increases processing efficiency of the control unit 203 by performing table creation 60 and output processing 61 in parallel. Two or more schedule tables 214 are prepared to prevent butting of tables between processes, and a memory area for working is allocated to each table.

In the table creation 60, in step S601, the scheduling unit 213 checks whether a table 1 is currently used. If the table 1 is not used (NO in step S601: corresponding to a case where the output processing 61 uses a table 2), the scheduling unit 213 writes schedule information in the table 1 to create a schedule table as a current table. If the output processing 61 currently uses the table 1 (YES in step S601), in step S603, the scheduling unit 213 writes schedule information in the table 2 to create a schedule table as a current table.

In the output processing 61, in step S605, the scheduling unit 213 checks whether a current table is the table 1. If the current table is the table 1 (YES in step S605), in step S606, the scheduling unit 213 performs rendering or writes bitmap data in an output spool based on a schedule written in the table 1. If the current table is not the table 1 (NO in step S605), in step S607, the scheduling unit 213 performs rendering or writes bitmap data in the output spool based on a schedule written in the table 2.

Next, referring to FIGS. 7A and 7B, creation of a schedule table will be described. In FIGS. 7A and 7B, a column of "PAGE ID" stores unique ID allocated in processing order of the printer 202. (In the case of a schedule table storing a plurality of job data, it suffices that ID is allocated in page order from a job of small job ID). A column of "RIP PROCESSING" stores the estimation of the rendering processing time of each page data acquired in step S403 or S404. A column of "PRINTING TIME" stores the printing time of each page data acquired by the first analysis unit in step S407.

The scheduling unit 213 determines "RIP END (RENDERING END TIME)", "TRANSMISSION START (TRANSMISSION START TIME OF BITMAP DATA)", and "PRINTING END (PRINTING END TIME)" based on "RIP TIME" and "PRINTING TIME" (described below in detail). Timing of starting rendering of first page data is set as zero among a plurality of scheduling target page data which were received. The "RIP END" indicates time that the rendering processing unit 217 of the printer 202 finishes rendering, for each page. The "TRANSMISSION START" indicates time when the scheduling unit 213 causes the output spool 208 to supply bitmap data to the printer engine unit 205, for each page. The "PRINTING END" indicates time when the printer engine unit 205 of the printer 202 finishes printing of the bitmap data, for each page.

In reality, a schedule table used when the scheduling unit 213 refers to the transmission start timing of the bitmap data is illustrated in FIG. 7B. FIG. 7A illustrates creation of the schedule table illustrated in FIG. 7B.

The scheduling unit 213 determines, in order from page data of PAGE ID 001 (hereinafter, simply page 001), "RIP END", "TRANSMISSION START", and "PRINTING END" as illustrated in FIG. 7A by processing illustrated in FIG. 8, and determines "TOTAL DELAY TIME (not illustrated)". The total delay time will be described below in detail.

In FIG. 8, in step S801, the scheduling unit 213 directly substitutes each of the "RIP END" and the "TRANSMISSION START" of the page 001 (first page) with "RIP PROCESSING: 30" of the page 001. The scheduling unit 213 substitutes the "PRINTING END" of the page 001 with "80" acquired by adding "PRINTING TIME: 50" of the page 001 to "TRANSMISSION START 30" of the page 001.

In step S802, the scheduling unit 213 refers to PAGE ID to focus on a next page (the page 001 has been processed, and hence the next page is 002). Hereinafter, a page being processed is referred to as a focused page.

In step S803, the scheduling unit 213 substitutes "RIP END" of the page 002 with "60" acquired by adding "RIP PROCESSING: 30" of the page 002 to "RIP END: 30" of the page 001 before the focused page.

In step S804, the scheduling unit 213 directly substitutes "TRANSMISSION START" of the focused page (page 002) with "PRINTING END: 80" of the page (page 001) before the focused page.

In step S805, the scheduling unit 213 determines whether "RIP PROCESSING" of the focused page (page 002) is larger than the "TRANSMISSION START" of the focused page.

The scheduling unit 214 determines NO at a point of time of focusing on the page 002. The processing proceeds to step S806, and the scheduling unit 213 substitutes "PRINTING END" of the focused page (page 002) with a value acquired by adding "PRINTING TIME: 40" to the "TRANSMISSION START: 80" of the focused page (page 002).

In step S807, the scheduling unit 213 determines whether there are any unprocessed pages. Hereinafter, determinations are similarly made, and data up to "TRANSMISSION START: 230" of a page 005 can be acquired.

Focusing on the page 005, "RIP END" is larger than "TRANSMISSION START" (YES In step S805), and hence RIP processing is clearly not in time for transmission of bitmap data.

Thus, the processing proceeds to step S809. The scheduling unit 213 subtracts "TRANSMISSION START: 230" from "RIP END: 250" of the focused page (page 005) to set a difference as "DELAY (indicating delay time): 20).

In step S810, the scheduling unit 213 substitutes the "TRANSMISSION START" of the focused page (page 005) with the "RIP END: 250" to similarly perform scheduling. "DELAY" is calculated for each appearance of a page where RIP processing is not in time for bitmap transmission.

When the focus is on a page 008, "RIP END: 420" is larger than "TRANSMISSION START: 400" (YES in step S805), and hence RIP processing is not in time for bitmap data transmission in the page 008. Thus, the processing proceeds to step S809, and the scheduling unit 213 calculates "20" as "DELAY" of the page 008.

When the processing of steps S802 to S807 is repeated to finish temporary scheduling for all the pages, the processing proceeds from step S807 to S808, and the scheduling unit 213 totals "DELAYS" of the pages to calculate "TOTAL DELAY TIME". In the example of FIG. 7A, total delay time is "20+20=40".

Bitmap data (rendering data) first rendered by the rendering processing unit 217 in a group of scheduling-target page data is set as head bitmap data (head rendering data). At a point of time of receiving the head bitmap data, the output spool 208 can start supplying the bitmap data to the printer engine unit 205.

Thus, when the total delay time is greater than zero (0), printing is highly likely to cause print overrunning. At least in FIG. 7A, print overrunning is anticipated to occur during rendering of the pages 005 and 008.

Figure 9:
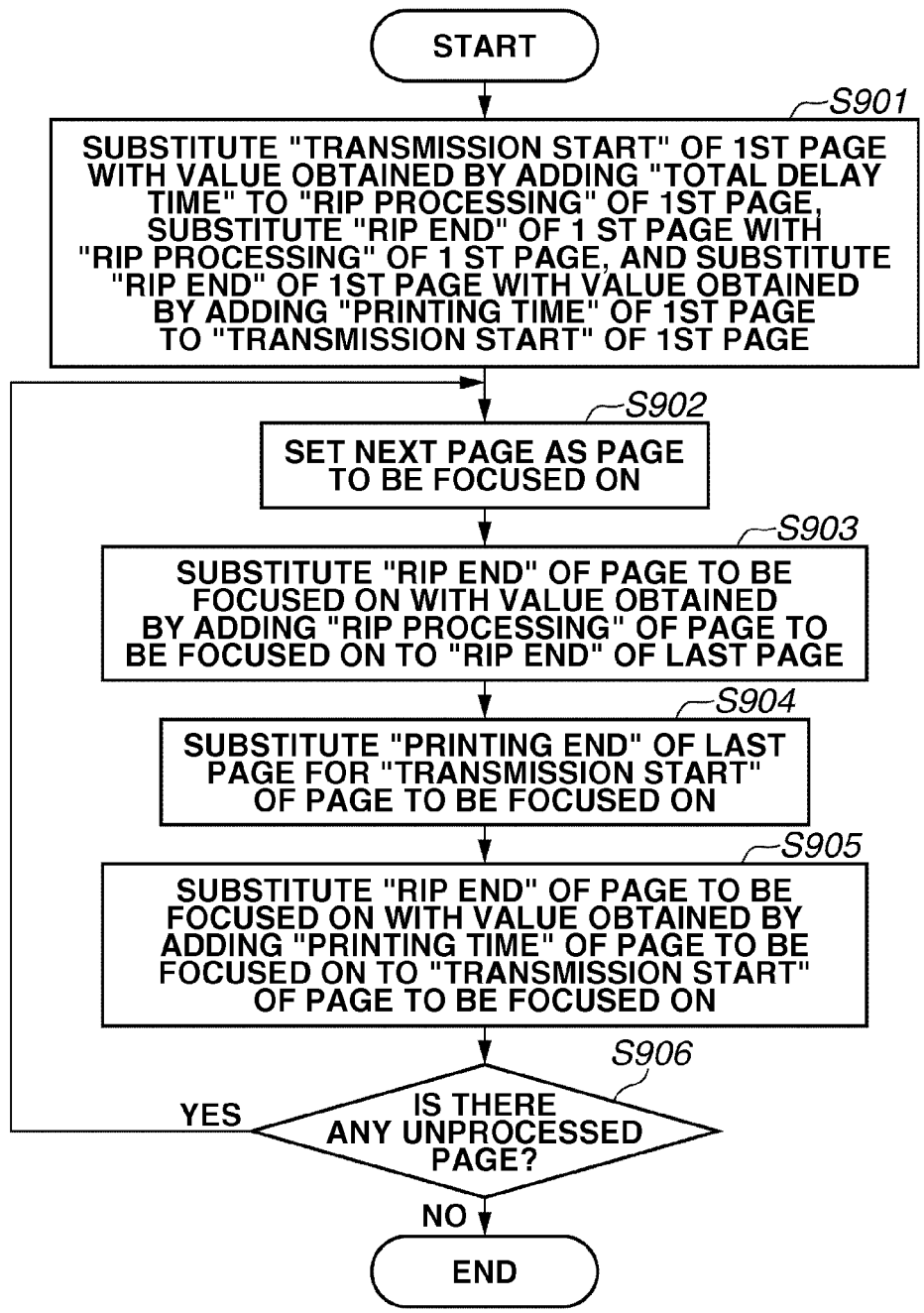
FIG. 9 is a flowchart illustrating scheduling performed by using total delay time apparatus according to an exemplary embodiment of the present invention.

The scheduling unit 213 accordingly creates, by using the "TOTAL DELAY TIME" illustrated in FIG. 7A, the schedule table illustrated in FIG. 7B by processing illustrated in FIG. 9. In FIG. 9, the scheduling unit 213 performs scheduling to cause the output spool 208 to start supplying the head bitmap data at an interval of time indicated by the total delay time from the point of time when the output spool 208 can supply the bitmap data (point of time when the rendering processing unit 217 finishes rendering of the head bitmap data) (more specifically, supply timing of the head bitmap data is delayed by as much as the total delay time). In step S901 illustrated in FIG. 9, the scheduling unit 213 substitutes the "TRANSMISSION START" of the page 001 with a value "70" acquired by adding the "TOTAL DELAY TIME: 40" acquired in FIG. 8 to the "RIP PROCESSING: 30" of the page 001. Processing thereafter is similar to that illustrated in FIG. 8, and hence description thereof is omitted. Specifically, steps S902 to S904 are similar to steps S802 to S804, step S905 is similar to step S806, and step S906 is similar to step S807.

Through the above-described processing, the schedule table illustrated in FIG. 7B can be created.

The table illustrated in FIG. 7B includes the column of "DELAY" for explanation. However, the "RIP END" is never larger than the "TRANSMISSION START", and hence calculation of "DELAY" is unnecessary.

When the schedule table illustrated in FIG. 7B is used, which has been created by the above-described processing, the scheduling can be executed so that RIP processing can be in time for transmission of the bitmap data without changing the order of the page data. Thus, printing can be started from RIP by an amount necessary for the RIP processing so as to be in time for transmission of the bitmap data. In this case, the rendered bitmap data can be released in rendering order from the memory without changing the order of jobs. As a result, long storage of the bitmap data in the memory is reduced, and the memory for storing the bitmap data can be efficiently used.

In the above description, the configuration in which the printer engine unit 205 does not receive any bitmap data of a next page until an end of printing of each page has been described. However, when the printer engine unit 205 includes a buffer, the printer engine unit 205 can receive bitmap data from the control unit 203 while printing. For example, when the printer engine unit 205 can store two page data, it suffices that timing of starting transmission of bitmap data from the control unit 203 to the printer engine unit 205 is set to printing end time of a page two pages before. Similarly, when the printer engine unit 205 includes a buffer that can store N page data, timing of "TRANSMISSION START" of bitmap data during scheduling of the output spool 208 is set to a point of time when the printer engine unit 205 finishes printing of a page N pages before.

In the above description, only the example of scheduling the single job data has been described. However, when the job data contains one page data, it suffices to schedule a plurality of jobs. When determining page data of a scheduling target, for example, jobs including a job to be received next are scheduled together to be printed all at once until printing end time reaches a predetermined value. In this case, it suffices that a column of "JOB ID" is set in the schedule table to create a schedule table for handling page data contained in a plurality of job data.

In the exemplary embodiment, for simpler explanation, the form of rendering and printing in order of page ID has been used. In reality, however, the first analysis unit 211 can analyze a bookbinding type (saddle stitching, side stitching, or perfect binding) associated with job data, and change order of page data supplied from the input buffer 207 to the rendering unit 204 according to the bookbinding type. For example, the page data are rearranged in reverse order in the case of the perfect binding, and rearranged in order of saddle stitch bookbinding in the case of the saddle stitching. The page data can also be rearranged based on information (reverse order) indicating not a bookbinding type but simply a printing order.

When there is only one page data of a printing target, there is only one page data of a scheduling target, and no scheduling is necessary. Hence, creation of a schedule table can be skipped.

Other Embodiments

Aspects of the present invention can also be realized by a computer of a system or apparatus (or devices such as a central processing unit (CPU), a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-078295 filed Mar. 30, 2010, which is hereby incorporated by reference herein in its entirety.

What is claimed is:

1. An image processing apparatus comprising:
an input unit configured to input a plurality of page data;
a rendering unit configured to convert each of the plurality of page data into rendering data;
a supply unit configured to supply the plurality of rendering data to a printing apparatus;
an acquisition unit configured to acquire, for each of the plurality of rendering data, delay time from an end of printing of a last page to an end of conversion of rendering data used for next printing; and
a scheduling unit configured to delay supply timing of rendering data converted first by the rendering unit among the plurality of page data based on the delay time of the plurality of rendering data,
wherein the acquisition unit includes a first acquisition unit configured to acquire rendering time for rendering each page data by the rendering unit and a second acquisition unit configured to acquire, for each rendering data, printing time for printing by the printing apparatus, and calculates the delay time based on the rendering time and the printing time acquired for the plurality of page data, and
wherein the acquisition unit acquires, when the rendering data generated from the page data is printed on a recording medium, the printing time based on a length of an area to be printed in a conveying direction.

2. The image processing apparatus according to claim 1, wherein a sum of all delay time of the plurality of rendering data is set as total delay time, and the scheduling unit delays the supply timing of the rendering data converted first by the rendering unit among the plurality of page data, by an amount of the total delay time.

3. The image processing apparatus according to claim 1, wherein the scheduling unit causes the supply unit to supply the rendering data converted first by the rendering unit at an interval of at least the delay time of the plurality of rendering data from a point of time when the rendering unit completes rendering of the rendering data converted first by the rendering unit.

4. The image processing apparatus according to claim 1, wherein the supply unit supplies the plurality of rendering data to the printing apparatus in order of conversion by the rendering unit.

5. The image processing apparatus according to claim 1, wherein the acquisition unit acquires the delay time before the printing apparatus starts printing.

6. The image processing apparatus according to claim 1, wherein the rendering unit converts a part of the plurality of page data into rendering data even while the supply unit delays supplying of the rendering data converted first by the rendering unit among the plurality of page data.

7. The image processing apparatus according to claim 1, further comprising a storage unit configured to store processing time information for holding rendering time per page in a predetermined print format, and an analysis unit configured to analyze the page data input by the input unit and a print format set in the page data,
wherein when the print format set in the page data input by the input unit is the predetermined print format, the acquisition unit acquires the rendering time by referring to the processing time information.

8. The image processing apparatus according to claim 7, further comprising an addition unit configured to add a skip flag to processing time information indicating a print format set in page data where the rendering time is less than the printing time,
wherein when the print format set in the page data input by the input unit is the print format indicated by the processing time information to which the skip flag has been added, processing of the acquisition unit is skipped, and the supply unit directly supplies the rendering data to the printing apparatus.

9. The image processing apparatus according to claim 1, wherein the page data contains a predetermined rendering command of a page description language, and the rendering unit generates the rendering data based on the rendering command.

10. The image processing apparatus according to claim 1, wherein the printing apparatus forms an image on a roll sheet to be cut after printing.

11. The image processing apparatus according to claim 1, wherein the acquisition unit acquires the rendering time of the page data by rendering a part of the page data by the rendering unit.

12. An image processing method comprising:
inputting a plurality of page data;
converting each of the plurality of page data into rendering data;
supplying the plurality of rendering data to a printing apparatus;
acquiring, for each of the plurality of rendering data, delay time from an end of printing of a last page to an end of conversion of rendering data used for next printing;
acquiring rendering time for rendering each page data;
acquiring, for each rendering data, printing time for printing by the printing apparatus;
calculating the delay time based on the rendering time and the printing time acquired for the plurality of page data;
acquiring, when the rendering data generated from the page data is printed on a recording medium, the printing time based on a length of an area to be printed in a conveying direction; and
scheduling to delay supply timing of rendering data converted first among the plurality of page data based on the delay time of the plurality of rendering data.

13. A non-transitory computer-readable storage medium storing a program, which when loaded into a computer and executed performs a method for image processing executed by an image processing apparatus, the method comprising:
inputting a plurality of page data;
converting each of the plurality of page data into rendering data;
supplying the plurality of rendering data to a printing apparatus;
acquiring, for each of the plurality of rendering data, delay time from an end of printing of a last page to an end of conversion of rendering data used for next printing;
acquiring rendering time for rendering each page data;
acquiring, for each rendering data, printing time for printing by the printing apparatus;
calculating the delay time based on the rendering time and the printing time acquired for the plurality of page data;
acquiring, when the rendering data generated from the page data is printed on a recording medium, the printing time based on a length of an area to be printed in a conveying direction; and scheduling to delay supply timing of rendering data converted first among the plurality of page data based on the delay time of the plurality of rendering data.

* * * * *